United States Patent Office 3,472,558
Patented Oct. 14, 1969

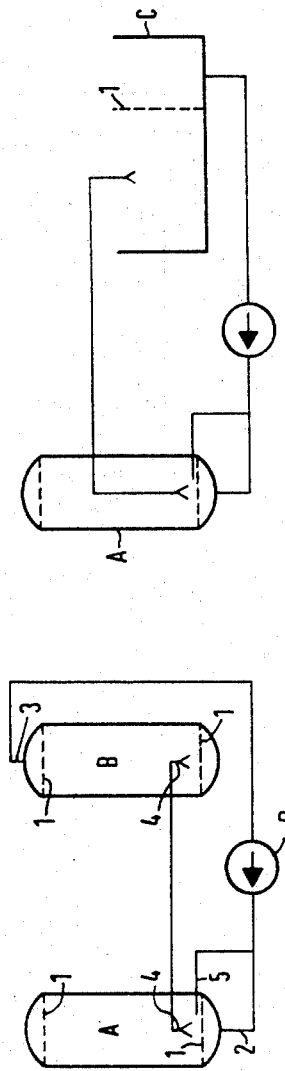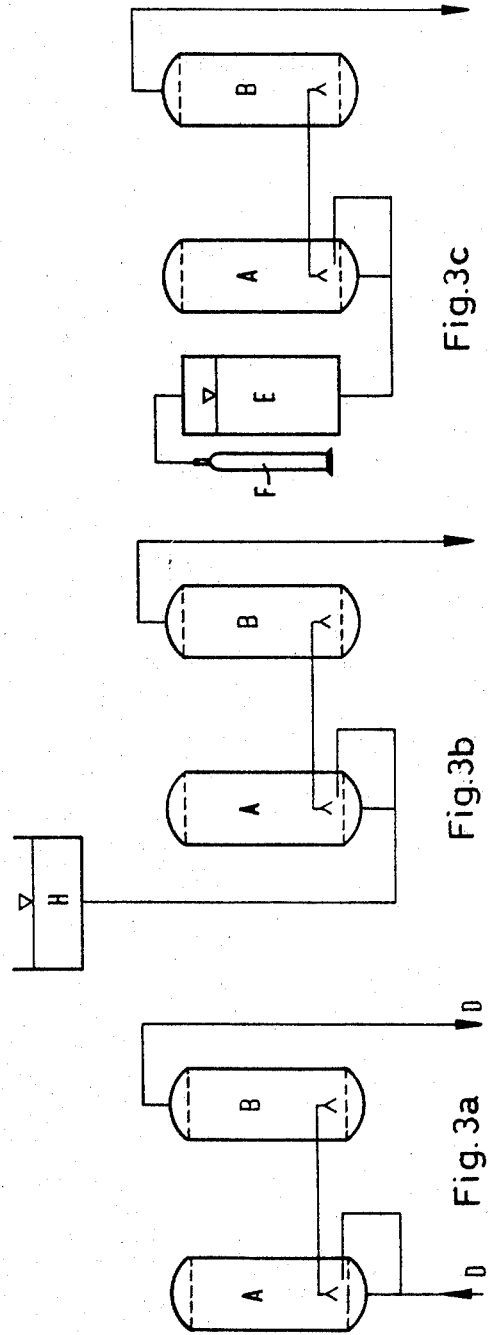

3,472,558
METHOD AND APPARATUS FOR CONVEYING GRANULAR MATERIAL THROUGH CONVEYOR DUCTS
Gunter Wittrowsky and Horst Goppelt, Erlangen, Germany, assignors to Siemens Aktiengesellschaft, a corporation of Germany
Filed Dec. 22, 1966, Ser. No. 603,927
Int. Cl. B65g 53/30
U.S. Cl. 302—14        8 Claims

ABSTRACT OF THE DISCLOSURE

Granular material is mixed with inwardly flowing conveyor media in a container, that is to be emptied and in the vicinity of the inlet to the conveyor duct or ducts, in a controllable manner so as to avoid an obstruction of the conveyor duct. The container is provided with openings through which conveyor media and/or media to be treated with the aid of granular material flow in different directions, and screens, porous sinter bodies, and the like constructed in correspondence with the grain size of the granular material present in the container for preventing the admission of the granular material into the openings.

---

Our invention relates to method and apparatus for conveying granular material, serving for example in the treatment of flowing media, through conveyor ducts, which connect to one another containers that are to be emptied and filled with the aid of a fluid and/or gaseous conveyor or transport medium. This conveying problem occurs, for example, for purifying devices when a regeneration of the spent filter bed in a filter vessel is itself not possible or is completely unsuitable or impractical for other reasons. Emptying of the spent filter material, which can for example consist of ion-exchanger material, can often be possible by hand. Also, a new refilling of this material can be carried out in this manner. This method is no longer advantageous, however, in widely automatized operations or plants. Morevore, when the filter bed is laden with contaminated materials, direct contact therewith is inadvisable. In such cases it is consequently suggested that the granular material be conveyed with the aid of a rinsing operation through the conveyor ducts. This is absolutely necessary when the container installations are located at least partly in inaccessible spaces such as is the case, for example, for nuclear reactor installations.

The heretofore known rinsing methods have the disadvantage particularly that obstructions are repeatedly formed in the conveyor ducts due to too high a concentration of the material therein. By additionally introducing rinsing fluid into the conveyor ducts, an effort was made to control or cure this difficulty. In addition to the very great expenditure of conveyor medium such as water, for example, which is required therefor, a further disadvantage of this method is that the container can often not be completely emptied. Automatization of this conveyor method is moreover bound up with further difficulties due to the complexity of the necessary conveyor medium supply system.

It is accordingly an object of our invention to provide method and apparatus for conveying granular material through conveyor ducts which avoids the aforementioned disadvantages of the heretofore known methods and the apparatus therefor and which more particularly avoids the occurrence of obstructions in the conveyor ducts and which permits complete emptying of the containers from which the material is to be conveyed.

With the foregoing and other objects in view, we provide in accordance with our invention, method of conveying granular material through conveyor ducts which comprises mixing the granular material within the container which is to be emptied and in the vicinity of the inlet to the conveyor duct or conveyor ducts, with inwardly flowing conveyor media in a controllable manner so that an obstruction of the conveyor duct can be safely avoided. The speed, amount, direction or location of the inwardly flowing conveyor media, or any two or more of these values, can accordingly be varied for adjusting the degree of mixing of the conveyor media and the granular material being conveyed. These conveyor media can be liquid or gaseous and, under certain conditions, can be employed simultaneously in both forms. Gaseous materials are expediently useable as auxiliary conveyor media when it appears advisable to adjust the height of the liquid to a specific level in the containers employed for carrying out the process. Bypass installations are not used, i.e. the entire flow of conveyor media is first conducted into the container, mixes therein with the filter material, discharges with the filter material through the conveyor ducts from these containers and separates again from the granular material entrained thereby in other containers during the further course of the method. The automatic termination of this method can be controlled by a special control device cooperating with a predetermined program, whereby the completion of this program is determined by the reading of level, pressure and pressure differential, conductivity and activity measuring and indicating devicees individually or in any desired combination, also with other measuring sensors for physical dimensions.

Other features which are considere as characteristic for the invention are set forth in the appended claims.

Although the invention is illustrated and described herein as method and apparatus for conveying granular material through conveyor ducts, it is nevertheless not intended to be limited to the details shown, since various modifications and structural changes may be made therein without departing from the spirit of this invention and within the scope and range of equivalents of the claims.

The construction of the apparatus and the method of its operation in accordance with our invention, however, together with additional objects and advantages thereof will be best understood from the following description when read in connection with the accompanying drawings, in which:

FIGS. 2a and 2b are schematic views of two diifferent embodiments of the apparatus for conveying granular material according to our invention;

FIGS. 3a, 3b and 3c are schematic views of modified forms of the embodiment of FIG. 2a.

Figure 1A:
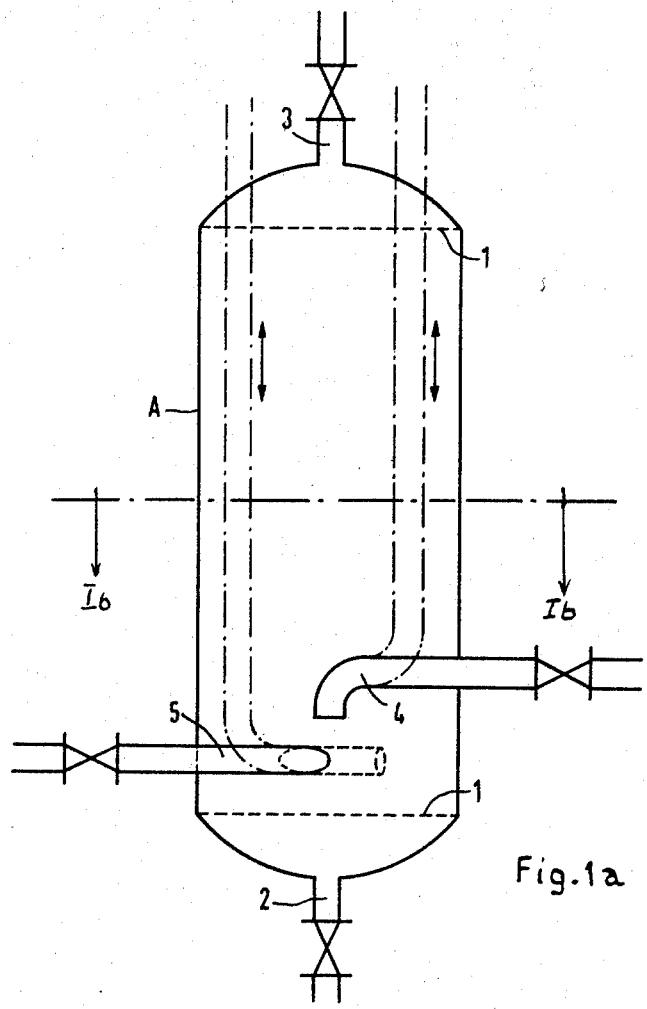
FIG. 1a is a schematic longitudinal view of a container for receiving granular material forming part of our invention.
Figure 1B:
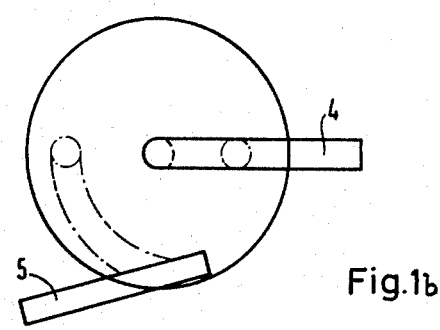
FIG. 1b is a schematic cross sectional view of FIG. 1a taken along the line Ib–Ib in the direction of the arrows.

Referring now to the drawings and first particularly to FIGS. 1a and 1b thereof, there is shown a receptacle or container for receiving granular material such as for example a filter bed which is set up to carry out the method of our invention. The container A is provided at both ends in the interior thereof with two substantially horizontally disposed screens 1 having a mesh diameter smaller than that of the smallest prospective grain size of the granular material to be used in carrying out the method of our invention. A supply duct 3 and a discharge duct 2 connect with the container A at locations thereof outside of the space between the screens 1. Suitable valves are provided for closing off flow through the ducts 2 and 3. A medium to be treated in the container A, such as a liquid or a gas, is supplied to the container A through the duct 3 and discharged therefrom through the duct 2. It is, however, also possible to employ these ducts 3 and 2 respectively for supplying conveyor media to the container A and discharging it therefrom. In the embodiment of FIGS. 1a and 1b, conveyor media are supplied through a duct 5 extending tangential to the peripheral surface of the container A and communicating with the interior thereof. The end opening of a conveyor duct 4 extends into the container A to substantially the center thereof, through which the conveyor media and the granular content of the container A are carried away. A plurality of conveyor or rinsing ducts 4 or 5 can extend into the container A so that their end opening is located substantially at different levels along the longitudinal axis thereof, whereby only a specific portion of the granular material is permitted to be conveyed through these ducts respectively. Also, in accordance with our invention, the ducts 4 or 5 or both can be located so that they are locally adjustable within the container A. Such an adjustable construction is indicated by the dot-dash or phantom lines in FIGS. 1a and 1b, showing ducts 4 and 5 that are adjustable in the direction of the asscociated double-headed arrows. Containers of the construction shown in FIGS. 1a and 1b are employed in the complete plant shown in FIG. 4 and hereinafter described.

FIG. 2a illustrates the basic principle of the invention. The filter material is to be transferred from container A to container B. Both containers A and B can have entirely the same structure. In all cases they are connected to one another, by the conveyor duct 4, and are both filled with a conveyor fluid before the conveyor operation is begun. When the pump P is turned on, the conveyor fluid is circulated through both containers A and B, then passes through the duct 2 into the container A and flows upwardly through the screens, as viewed in FIG. 1a. Thus the conveyor fluid intermixes with the granular filter material and flows through the duct 4 into the container B. Through the duct 3 at the upper end of the vessel B, the conveyor fluid returns to the pump P to complete the cycle. The entrained granular material, however, deposited on the lower screen 1 of the container B as viewed in FIG. 1a. The final remainders of the filter material in the container A are not completely removed solely with this flow guidance. If complete emptying of the container A is necessary, the conveyor medium is supplied through the duct 5 to the container A after a drop takes place in the level of the conveyor medium in the container A to substantially the height of the granular material layer therein. This duct 5 guides the conveyor medium tangentially into the interior of the container A so that a circular or vortex flow arises which accumulates the remainder of the filter material beneath the opening of the conveyor duct 4, introduces it into the duct 4 and thereby permits the entire removal of the filter material from the container A. Obviously, it is not necessary that two closed containers be used for carrying out this method of conveying, but rather the collecting container, as shown in FIG. 2b, can also be in the form of an open tub or vat C provided with a substantially vertically extending screen 1. Moreover, the container A need not be necessarily closed on all sides but rather a vat or tub having an open top can also be emptied of its granular content in accordance with the aforedescribed method of our invention.

The conveyor medium also does not necessarily have to be circulated in a circuit or loop. It is possible to employ water from a pressure water system which can be permitted to discharge from the apparatus of our invention after traversing the containers A and B. Such a condition is clearly shown in FIG. 3a in which the ducts D supply the pressure water to and discharge it from the apparatus. The pressure of the pressure water system can be produced by pumps as well as by geodetically elevated containers or by liquid gas. In FIG. 3b there is shown for this very purpose the addition of an elevated container H for supplying water under pressure to the container A. In an analogous manner, FIG. 3c shows a tank F for supplying pressure gas to one compartment of a supply container E having a moving diaphragm which transmits the pressure to the conveyor medium which is located in the other compartment of the supply container E for supplying the conveyor medium to the container A.

Figure 4:
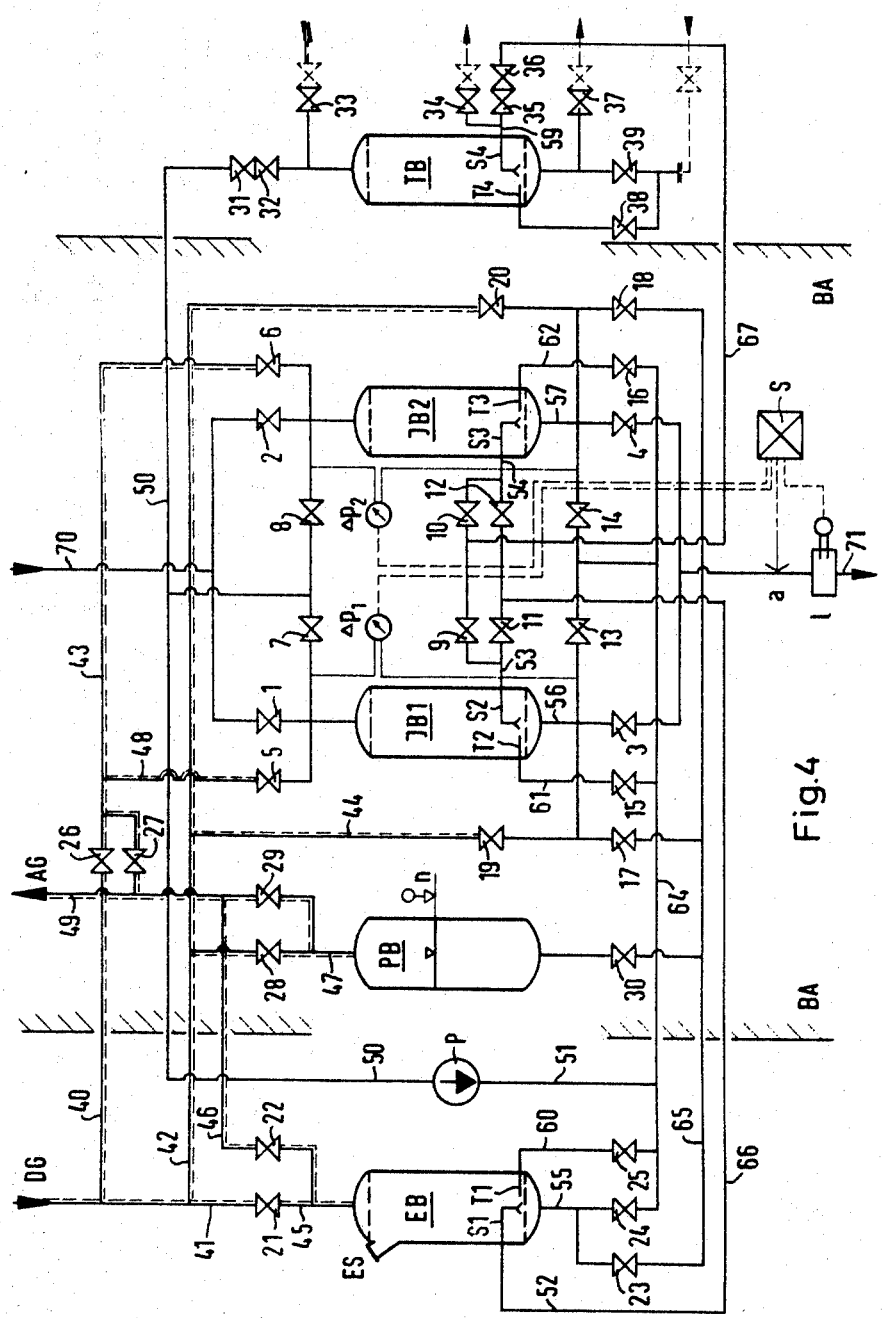
FIG. 4 is a schematic flow network diagram of a water purification plant utilizing the apparatus of the invention.

The previously mentioned FIG. 4 shows a flow chart of a water prification plant such as is required, for example, for nuclear reactors. The medium which is to be purified can be either ordinary water or heavy water, for example. Correspondingly, the filter material can consist, for example, of ion-exchanger resins. In the plant illustrated as an example in FIG. 4, the water which is to be purified flows through the duct 70 into the system and through the the duct 71 out of the system and follows a path either through the ion-exchanged container IB1 or the ion-exchanger container IB2. One of the containers respectively is in operation while the other is emptied of spent ion-exchanger material and filled with new ion-exhanger material. The ion-exchanger materials used are conveyed in accordance with our invention into the conveyor container TB, the pump P forcing the conveyor medium, which expediently is the same medium as that which is to be purified, through the individual containers in a manner hereinafter further described. The fresh ion-exchanger material is deposited by hand in the feed container EB and remains there in readiness for automatic conveyance to one of the two ion-exchanger containers IB1 and IB2. In order that all ion-exchanger containers may be completely emptied, the operation is additionally carried out with a change in the level of the conveyor medium in the different containers. In the respective container that is to be completely emptied, the conveyor medium is caused to sink down to about the level of the layer of granular material by means of pressure gas which can be supplied from a special duct DG. The conveyor medium TM displaced thereby is received in a buffer or expansion container PB. The gas which escapes when the container PB is being filled therewith is discharged through the waste-gas duct AG. The three containers, namely the ion-exchanger containers IB1 and IB2 and the expansion container PB, are located in an inaccessible zone which is shielded on all sides by concrete walls BA. A control device S is provided for automatically carrying out the conveyor method of our invention by regulating the performance of the individual steps of our method in accordance with a pre-adjusted program which is controlled not only by preset timers but also by the indicator dials of differential pressure and level measuring devices as well as measuring devices for the activity and conductivity of the medium which is to be purified. Such control devices are of conventional construction and are well-known in the art.

The ion-exchanger containers IB1 and IB2 were filled, in different examples, with 200 l. cation exchanger Lewatite S 100, 200 l. anion exchanger Lewatite M 500 and with 200 l. of a mixture bed of both exchanger types. The containers had approximately the following dimensions: inside diameter approximately 500 mm., distance between the screens approximately 1250 mm. The spacing of the opening of the conveyor ducts 5 from the lower screen as shown in the figures was about 25 mm. The grain size of the ion-exchange resin was from 0.3 to 1.2 mm., the mesh size of the screens being about 0.2 mm. The pump P serving for circulating the conveyor medium, such as heavy or light water for example, was a centrifugal pump with an output of 4 m.$^3$/h. and an output level of about 5 at. The nominal diameter of the tubular ducts was about 20 to 25 mm.

The automatically controlled operation of the individual steps of the conveyor method of our invention is hereinafter described. The ion-exchanger container IB1 is thus emptied and filled with new material. The reference numerals mentioned hereinafter in parentheses relate in each case to the same operating step, occurring, however, with regard to the ion-exchanger container IB2.

At the beginning of the conveying operations, the ion-exchanger containers IB1 and IB2 as well as the conveyor container and the conecting tubular ducts are filled with water, while the buffer container PB is empty, on the other hand. The feed container EB contains the fresh ion-exchanger material manually supplied through the feed tube ES.

As described hereinbefore, the water to be purified flows through the duct 70 and the valve 1 (2) to the ion-exchange container IB1 (IB2) and through the duct 56 (57), the valve 3 (4) and the duct 71 out again in purified condition. When the filter bed in the container IB1 (IB2) is exhausted or spent, this condition is signalled to the control device S through the activity-measuring device $a$ and/or the conductivity measuring device $l$ and/or the pressure difference measuring device $\Delta p_1$ ($\Delta p_2$). Such devices are of conventional construction. The control device S thereupon initially effects switch-over of the water current which is to be prified to the ion-exchanger IB2 (IB1) and removal of the spent filter bed from the container IB1 (IB2). In addition, the valves 2 and 4 (1 and 3) are then opened and the valves 1 and 3 (2 and 4) closed. The ion-exchange container IB2 (IB1) is therewith set into operation as the purifying filter. Thereafter, the valves 13, 9, 35 and 36 (14, 10, 35 and 36) as well as valves 31 and 32 are opened and the pump P is turned on. Through the circuit or loop formed by the ducts 51, 64, 56, (57), 53, (54), 67, 59 and 50, the main quantity of the ion-exchanger resin located in the ion-exchanger container IB1 (IB2) is conveyed to the conveyor container TB. This operation is ended after a period of for example 15 minutes and the valves 9 and 13 (10 and 14) are closed. To remove the last remainder of the ion-exchanger resins from the container IB1 (IB2) the water level in the ion-exchanger container IB1 (IB2) is lowered by opening the valves 26, 5, 17, 30, 29 (26, 6, 18, 30, 29). By this valve setting, pressure gas is passed from the duct DG into the ion-exchanger container IB1 (IB2) and forces the water located therein into the adjacent compartment of the buffer container PB, which on the outlet side thereof is connected to the waste-gas duct AG. The water flows consequently through the duct 56, (57), the valve 17 (18) and the valve 30 (30). When the level in the ion-exchange container IB1 (IB2) has been lowered to a predetermined height of, for example, 10 cm.—this is related to a corresponding level in the buffer container PB—the level measuring device $n$ thus causes the valves 26, 5, 17, 30 and 29 (26, 6, 18, 30 and 29) to be closed. The valves 15 and 9 (16 and 10) are subsequently opened, and the pump P forces the conveyor medium through the ducts 64, 61, 53, 67 and 50 (64, 62, 54, 67 and 50).

The conveyor medium is therewith fed tangentially into the container IB1 (IB2) through the pipe T2 (T3) opening into the container IB1 (IB2). The circular or vortex flow that is produced forces the remainder of the ion-exchanger grains toward the middle of the screen located at the bottom of the containers as viewed in FIG. 4 from where they move upwardly with the conveyor liquid so as to enter into the opening S2 (S3) of the conveyor duct 53 (54). This processing step requires, for example, 10 minutes for complete emptying of the container IB1 (IB2) and after the termination of this period, the processing step is ended by the automatic shut-off of the pump P and closing of the valves 35, 36, 31, 32, 15 and 9 (35, 36, 31, 32, 16 and 10). Before the then empty ion-exchanger container IB1 (IB2) can be filled with new material, the water located in the buffer container PB is returned into the container IB1 (IB2) and for this purpose the valves 28, 30, 17, 5 and 27 (28, 30, 18, 6 and 27) are opened. Pressure gas then flows through the duct 42 and 47 into the buffer container PB and forces the water through the duct 56 (57) back into the container IB1 (IB2). The gas escaping therefrom through the valve 5 (6) passes through the duct 48 and the valve 27 to the discharge duct 49. As soon as the level measuring device $n$ indicates the emptying of the buffer container PB, the valves 28, 30, 17, 5 and 27 (28, 30, 18, 6 and 27) close.

To convey the new ion-exchanger material from the feed container EB into the ion-exchanger container IB1 (IB2), the control device S then opens the valves 24, 11 and 7 (24, 12 and 8). The pump P is switched on and drives the conveyor medium (water) through the duct 51, 55, 52, 66, 53 (54) and 50. In this way, the new ion-exchanger material is rinsed out of the feed container EB into the ion-exchanger container IB1 (IB2). When the conveyance of the main quantity of the new ion-exchanger material is ended after 15 minutes, for example, the pump P is shut off and the valves 11 and 24 (12 and 24) are closed.

For removing the remaining quantity of the new ion-exchanger material from the feed container EB, the water level is lowered in a manner similar to that described hereinbefore with regard to the ion-exchanger container IB1 (IB2) and is forced with pressure gas into the buffer container PB. For this purpose, the valves 21, 23, 30 and 29 are opened. The pressure gas passes through the ducts 41 and 45 into the feed container EB and forces the water located therein through the ducts 55 and 65 into the buffer container PB. When the level of the water in the feed container EB has sunk to a minimum height of 10 cm., for example, above the lower screen as seen in FIG. 4—this corresponds to a corresponding level in the buffer container PB—the level measuring device $n$, through the control device S, thus causes the valves 21, 23, 30 and 29 to close. Thereafter, the valves 25 and 11 (25 and 12) are opened. The pump P sets the conveyor medium again in motion. This is effected through the duct 60 and the pipe T1 extending tangentially into the feed container EB, producing a circular or vortex flow. This turbulent flow accumulates the remainder of ion-exchanger resin in the middle of the lower screen and rinses it into the opening S1 of the conveyor duct 52. The remainder of the fresh ion-exchanger material thus passes through the ducts 66 and 53 (54) to its final location in the operation, the ion-exchanger container IB1 (IB2). After an again empirically-determined period of, for example, 10 minutes, the conveyance of the remainder of the new ion-exchanger material is safely ended, and the control device S turns off the pump P and closes the valves 11, 7 and 25 (12, 8 and 25).

When dealing with the conveyance of mixed bed-ion-exchanger masses, it is necessary to thoroughly mix both components of the mixed bed-ion-exchanger masses at the operational location, that is, in the container IB1 (IB2). For this purpose, the valves 27, 5 and 19 (27, 6 and 20) are opened. This feature is naturally provided beforehand in the preadjusted control program of the device S. Through these valves, the pressure gas flows into the ducts 42, 44 and 56 (57), to the container IB1 (IB2) and discharges from the latter through the ducts 48 (43) and 49. After thorough mixing of the ion-exchanger resins, for a period established at approximately 5 minutes, the last-mentioned valves are again automatically closed.

The ion-exchanger container IB1 (IB2) is then filled with new ion-exchanger resin and thus is prepared for the new charge or entry into the apparatus. This begins when the initially mentioned indicating devices have signalled the control device that the filter bed in the ion-changer container IB2 (IB1) is spent. The control device thereupon causes the valves 2 and 4 to close automatically and the valves 1 and 3 to open automatically so that the flow of the water to be purified from the duct 70 again occurs through the filter bed of the ion-exchanger container IB1 (IB2). As a precondition for the removal of the spent filter masses from the ion-exchanger container IB2 (IB1), the buffer container PB is thereafter again emptied of conveyor medium and for this purpose the valves 28, 30, 23 and 22 are opened. Pressure gas passes thereby through the ducts 42 and 47 into the buffer container PB and forces the water located therein through the ducts 65 and 55 into the feed container EB. The aforementioned valves 28, 30, 23 and 22 again close when the level measuring device $n$ indicates the complete emptying of the buffer container PB. The control device S then signals that the feed container EB can be charged with new ion-exchanger material and the conveyor container TB can be removed and emptied. When the emptied conveyor container PB is again connected to its connecting ducts, the emptying of the ion-exchanger container IB2 (IB1) and the recharging thereof can then be begun, if desired.

The foregoing example of a water-refining plant should indicate that it is possible in accordance with the method of our invention to carry out fully automatically and remotely the exchange of spent granular materials such as ion-exchanger materials, for example. The circuit diagram of FIG. 4 merely shows one example and it is of course understood that in actual practice, the necessary circuits will be based upon the technical requirements of the individual case, while retaining, however, the basic principle of the conveyor method of our invention. Thus, it is for example also possible to exchange in a similar manner filter inserts, which serve for gas purification, whereby the conveyor medium does not necessarily have to be identical with the medium which is to be purified. Naturally, the sole use of our method for the conveyance of granular material—even when it is not to be employed in carrying out chemical or physical reactions—is fully within the scope of this invention. The example with water given herein was chosen because it is concerned with a case that has been tested in actual practice.

Other suitably permeable members such as a sintered body or the like can be substituted for the screens 1.

We claim:

1. In apparatus for performing a method of conveying granular material through a conveyor duct interconnecting a filled container that is to be emptied and an empty container that is to be filled by mixing in the filled container in the vicinity of the inlet to the conveyor duct granular material present in the filled container with fluid conveyor medium flowing inwardly into the filled container, and adjusting at least one flow condition of the conveyor medium flow for controlling the mixing of the granular material and conveyor medium so that the resulting mixture is forced through the conveyor duct into the empty container and obstruction of the conveyor duct by the granular material is avoided, comprising permeable means disposed in at least one of said containers for blocking passage therethrough of granular material above a predetermined size and for permitting passage therethrough of fluid medium, said permeable means being so located relative to inlet openings in said container for supplying the conveyor medium and the medium to be treated by the granular material as to permit the flow therethrough of said media in opposite directions but prevent the granular material from passing therethrough into said inlet openings, said conveyor medium being a liquid and including means for supplying an auxiliary conveyor medium in the form of a gas to said container for adjusting the liquid level therein.

2. In apparatus for performing a method of conveying granular material through a conveyor duct interconnecting a filled container that is to be emptied and an empty container that is to be filled by mixing in the filled container in the vicinity of the inlet to the conveyor duct granular material present in the filled container with fluid conveyor medium flowing inwardly into the filled container, and adjusting at least one flow condition of the conveyor medium flow for controlling the mixing of the granular material and conveyor medium so that the resulting mixture is forced through the conveyor duct into the empty container and obstruction of the conveyor duct by the granular material is avoided, comprising permeable means disposed in at least one of said containers for blocking passage therethrough of granular material above a predetermined size and for permitting passage therethrough of fluid medium, said permeable means being so located relative to inlet openings in said container for supplying the conveyor medium and the medium to be treated by the granular material as to permit the flow therethrough of said media in opposite directions but prevent the granular material from passing therethrough into said inlet openings, the inlet opening of said conveyor duct in said container being adjustably movable over substantially the entire length of said container.

3. In apparatus for performing a method of conveying granular material through a conveyor duct interconnecting a filled container that is to be emptied and an empty container that is to be filled by mixing in the filled container in the vicinity of the inlet to the conveyor duct granular material present in the filled container with fluid conveyor medium flowing inwardly into the filled container, and adjusting at least one flow condition of the conveyor medium flow for controlling the mixing of the granular material and conveyor medium so that the resulting mixture is forced through the conveyor duct into the empty container and obstruction of the conveyor duct by the granular material is avoided, comprising permeable means disposed in at least one of said containers for blocking passage therethrough of granular material above a predetermined size and for permitting passage therethrough of fluid medium, said permeable means being so located relative to inlet openings in said container for supplying the conveyor medium and the medium to be treated by the granular material as to permit the flow therethrough of said media in opposite directions but prevent the granular material from passing therethrough into said inlet openings, the inlet opening for said conveyor medium to said container being adjustably movable over substantially the entire length of said container.

4. In apparatus for performing a method of conveying granular material through a conveyor duct interconnecting a filled container that is to be emptied and an empty container that is to be filled by mixing in the filled container in the vicinity of the inlet to the conveyor duct granular material present in the filled container with fluid conveyor medium flowing inwardly into the filled container, and adjusting at least one flow condition of the conveyor medium flow for controlling the mixing of the granular material and conveyor medium so that the resulting mixers is forced through the conveyor duct into the empty container and obstruction of the conveyor duct by the granular material is avoided, comprising permeable means disposed in at least one of said containers for blocking passage therethrough of granular material above a predetermined size and for permitting passage therethrough of fluid medium, said permeable means being so located relative to inlet openings in said container for supplying the conveyor medium and the medium to be treated by the granular material as to permit the flow therethrough of said media in opposite directions but prevent the granular material from passing therethrough into said inlet openings, and further comprising at least one supply duct for a gaseous conveyor medium connected at the upper end of said container, at least one supply duct for a liquid conveyor medium at the bottom end of said container and at least one supply duct for a liquid conveyor medium laterally connecting with said container intermediate the ends thereof for producing turbulent flow therein.

5. In apparatus for performing a method of conveying granular material through a conveyor duct interconnecting a filled container that is to be emptied and an empty container that is to be filled by mixing in the filled container in the vicinity of the inlet to the conveyor duct granular material present in the filled container with fluid conveyor medium flowing inwardly into the filled container, and adjusting at least one flow condition of the conveyor medium flow for controlling the mixing of the granular material and conveyor medium so that the resulting mixture is forced through the conveyor duct into the empty container and obstructions of the conveyor duct by the granular material is avoided, comprising permeable means disposed in at least one of said containers for blocking passage therethrough of granular material above a predetermined size and for permitting passage therethrough of fluid medium, said permeable means being so located relative to inlet openings in said container for supplying the conveyor medium and the medium to be treated by the granular material as to permit the flow therethrough of said media in opposite directions but prevent the granular material from passing therethrough into said inlet openings, and further comprising at least one supply duct for a gaseous conveyor medium connected at the upper end of said container, at least one supply duct for a liquid conveyor medium at the bottom end of said container and at least one supply duct for a liquid conveyor medium laterally connecting with said container intermediate the ends thereof for producing circular flow therein.

6. In apparatus for performing a method of conveying granular material through a conveyor duct interconnecting a filled container that is to be emptied and an empty container that is to be filled by mixing in the filled container in the vicinity of the inlet to the conveyor duct granular material present in the filled container with fluid conveyor medium flowing inwardly into the filled container, and adjusting at least one flow condition of the conveyor medium flow for controlling the mixing of the granular material and conveyor medium so that the resulting mixture is forced through the conveyor duct into the empty container and obstruction of the conveyor duct by the granular material is avoided, comprising permeable means disposed in at least one of said containers for blocking passage therethrough of granular material above a predetermined size and for permitting passage therethrough of fluid medium, said permeable means being so located relative to inlet openings in said container for supplying the conveyor medium and the medium to be treated by the granular material as to permit the flow therethrough of said media in opposite directions but prevent the granular material from passing therethrough into said inlet openings, and further comprising at least one supply duct for a gaseous conveyor medium connected at the upper end of said container, at least one supply duct for a liquid conveyor medium at the bottom end of said container and at least one supply duct for a liquid conveyor medium laterally connecting with said container intermediate the ends thereof for producing vortex flow therein.

7. For use in a nuclear reactor installation, apparatus for performing a method of conveying granular material through a conveyor duct interconnecting a filled container that is to be emptied and an empty container that is to be filled by mixing in the filled container in the vicinity of the inlet to the conveyor duct granular material present in the filled container with fluid conveyor medium flowing inwardly into the filled container, and adjusting at least one flow condition of the conveyor medium flow for controlling the mixing of the granular material and conveyor medium so that the resulting mixture is forced through the conveyor duct into the empty container and obstruction of the conveyor duct by the granular material is avoided, comprising permeable means disposed in at least one of said containers for blocking passage therethrough of granular material above a predetermined size and for permitting passage therethrough of fluid medium, said permeable means being so located relative to inlet openings in said container for supplying the conveyor medium and the medium to be treated by the granular material as to permit the flow therethrough of said media in opposite directions but prevent the granular material from passing therethrough into said inlet openings, and also including a control device for automatically carrying out the method in response to at least one device of level, pressure and pressure difference measuring devices in a nuclear reactor installation, and conductivity and activity measuring and indicating devices for the reactor and other sensing devices for measuring physical dimensions of components of the nuclear reactor installation, in accordance with a predetermined program.

8. Method for use in a nuclear reactor station of conveying granular material through a conveyor duct interconnecting a filled container that is to be emptied and an empty container that is to be filled, which comprises mixing in the filled container in the vicinity of the inlet to the conveyor duct granular material present in the filled container with fluid conveyor medium flowing inwardly into the filled container, and adjusting at least one flow condition of the conveyor medium flow for controlling the mixing of the granular material and conveyor medium so that the resulting mixture is forced through the conveyor duct into the empty container and obstruction of the conveyor duct by the granular material is avoided, and wherein the granular material consists of ion-exchanger material for use in purifying water in a shielded location of the nuclear reactor station.

References Cited
UNITED STATES PATENTS

| | | | |
|---|---|---|---|
| 739,150 | 9/1903 | Canon | 302—14 |
| 2,395,727 | 2/1946 | Devol | 302—29 |
| 2,533,296 | 12/1950 | Stuart | 302—50 |
| 2,734,782 | 2/1956 | Galle | 302—53 |
| 3,149,884 | 9/1964 | Jones | 302—53 |
| 3,179,378 | 4/1965 | Zenz et al. | 302—53 |

ANDRES H. NIELSEN, Primary Examiner